3,284,491
PREPARATION OF A PERACID IN A
SINGLE LIQUID PHASE
Malcolm Korach and Donald R. Nielsen, Corpus Christi, Tex., assignors to Pittsburgh Plate Glass Company, Pittsburgh, Pa., a corporation of Pennsylvania
Filed July 5, 1963, Ser. No. 293,080
8 Claims. (Cl. 260—502)

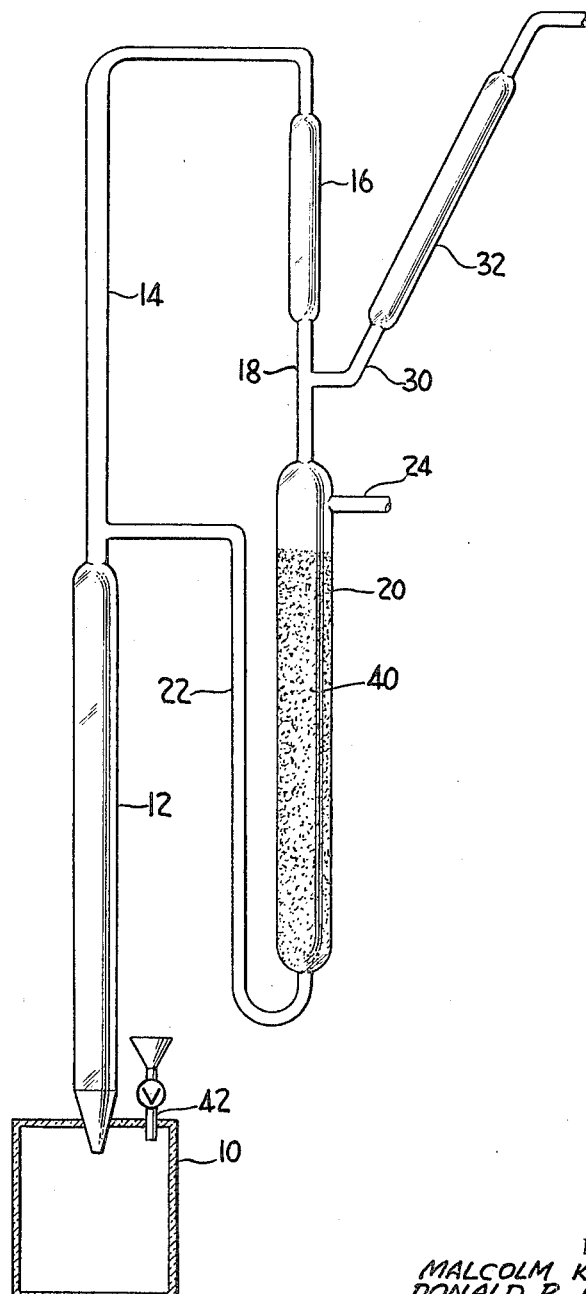

This invention relates to the preparation of percarboxylic acids from their carboxylic acid precursors. The reaction is conducted by reaction of the carboxylic acid with hydrogen peroxide, usually in the presence of a suitable catalyst, such as sulphuric acid.

The production of peracids by this means is complicated by the fact that the reaction of the peroxide with the carboxylic acid is an equilibrium reaction. Thus, the reaction tends to proceed only partially, at which time it reaches an equilibrium.

As disclosed in U.S. Patent No. 2,877,266, granted to Malcolm Korach on Mar. 10, 1959, it is possible to produce a percarboxylic acid in greater yield and to drive the reaction to a greater degree of completion by introducing into the reaction mixture, before or during distillation, a water immiscible solvent which forms an azeotrope with water. In consequence, as the azeotrope is distilled removing the water, the reaction continues to move toward the production of the peracid and therefore substantial yields of the peracid, based upon the theoretical from the carboxylic acid precursor, can be obtained.

One difficulty even with this process, however, is potential hazard. Many percarboxylic acids, as well as concentrated hydrogen peroxide, are explosive. Particularly is this so when these agents are in a high concentration, for instance, 60 percent or more.

In the process as practiced according to the above patent, when utilizing a carboxylic acid which does not significantly solubilize water and hydrogen peroxide (such as is done by acetic acid or propionic acid), a two-liquid phase system, the one being largely organic, the other being largely aqueous, can be formed. As the process proceeds, there is serious danger that the aqueous phase can become concentrated to the point where the percarboxylic acid and/or hydrogen peroxide is in such a high concentration as to create a potential explosive hazard. Particularly is this the case in commercial equipment which, being of metal, is not transparent. In such equipment it, of course, is very difficult to observe exactly the manner in which the reaction proceeds and thus the development of an explosive mixture or concentration of peracid can readily occur without detection by the operator. Another difficulty of the process as described in the above patent is that significant amounts of hydrogen peroxide are frequently removed by distillation along with the azeotrope of water and organic solvent. This is true even though a fractionating column surmounts the reactor and a relatively large amount of refluxing organic solvent is returned to the top of this column.

In accordance with the present invention, these difficulties have been avoided or minimized. In the practice of this invention, the process is conducted using an additional solvent which is water soluble or water miscible. Enough of such solvent is used to make certain that substantially all of the liquids in the reaction mixture undergoing distillation exist in a single liquid phase. While the existence of some dispersed droplets of an immiscible phase is not objectionable, enough solvent should be present so that no layer of aqueous phase can separate from the organic liquid phase. In consequence, whether the peracid is dissolved or is in precipitated solid state in the reaction mixture, it will be suspended and highly diluted with the single liquid reaction phase. In addition to minimizing or eliminating the explosive hazards of such a process, the presence of a water soluble solvent component results in a greatly decreased loss of hydrogen peroxide in the overhead vapors. This may be due to the fact that small amounts of the water soluble component in the reflux act as an extractant for the ascending hydrogen peroxide vapors and keep washing the hydrogen peroxide back into the reactor.

Generally, enough of the two solvents are present to provide at least 0.5 to 0.7 part of each solvent per part by weight of peracid. In consequence, even if an accidental separation of peracid could take place into an aqueous phase, this aqueous phase, however concentrated, would also contain a substantial amount of water miscible solvent, generally diluting the mixture below an explosive range.

Water immiscible solvents which are used include the chlorinated hydrocarbons, such as ethylene dichloride, carbon tetrachloride, methyl chloride, methylene chloride, and the like, as well as fluoro carbons, such as dichloro difluoro methane. Also included are other organic solvents, such as benzene and toluene, which form an azeotrope with water, the azeotropes distilling off at temperatures not substantially in excess of and usually somewith below 100° C. Such azeotropes contain less than 0.5 mol of peracid per mol of water and may contain little or no peracid.

To avoid the necessity of distilling excessive amounts of water, the hydrogen peroxide used usually contains at least 50 percent by weight of $H_2O_2$, most efficient operations relying upon use of hydrogen peroxide solutions containing at least 70 to 99 percent by weight of $H_2O_2$.

The amount of hydrogen peroxide which is added is enough to react with at least the major portion of the carboxylic acid, usually being in the range of the stoichiometric amount of carboxylic acid used, the hydrogen peroxide normally being in slight stoichiometric excess, for example, 1 to 10 percent in excess, of the carboxyl groups in the mixture. A good range of hydrogen peroxide used is from about 0.75 to 1.5 moles of $H_2O_2$ per carboxylic acid group.

A very substantial concentration of liquid solvents is used. Normally, the reaction mixture, during distillation of water therefrom, contains at least 25 percent by weight of the two solvents, based upon the weight of the reaction mixture which contains hydrogen peroxide, percarboxylic acid, carboxylic acid, water, and solvent. Usually, much larger amounts of combined solvents are used and, in general, the amount of solvents normally exceeds 50 percent by weight, based upon the weight of the reaction mixture.

The amount of water soluble or water miscible solvent which is used should be sufficient to essentially form a single liquid phase in the reaction mixture, i.e., in the liquid being heated to distill an azeotrope therefrom. Often, the water miscible solvent will be present in an amount at least 20 to 40 percent by volume of the water immiscible solvent, and generally the water miscible solvent will be in excess of these values, although the concentration of water miscible solvent very rarely falls below 10, and rarely exceeds 90, percent by weight of the total solvent present, the balance being the azeotroping (water immiscible) solvent.

Various solvents which are essentially inert to the reactants (the carboxylic acid and the peroxide) and inert to the percarboxylic acid produced may be used. These solvents should be either miscible with water or have a substantial solubility in water, for example, in excess of 100 grams per liter. They also should be miscible with or have a substantial solubility in the water immiscible solvent.

Typical solvents which are especially useful are those organic ethers which are soluble in water, such as dioxane, dimethyl ether of ethylene glycol, dimethyl ether of diethylene glycol or of triethylene glycol or of 1,2-propylene glycol or ethers of glycerol or of dipropylene glycol. Among the other solvents which can be used are sulfolane and tetrahydrofuran. Of course, the water miscible solvent should be miscible with, or at least very soluble in the water immiscible solvent so that two liquid phases are not produced. As a general rule, the water miscible solvent should boil at a temperature above that at which the azeotrope forms so that little or none of the water miscible solvent distills over.

The process may be conducted readily in an apparatus of the character illustrated in the accompanying diagrammatic drawing. As therein indicated, the apparatus comprises a flask or kettle suitable for use as a reactor 10 communicating with a fractionating colum 12. The upper end of the fractionating column exits through line 14 to a condenser 16 which discharges through line 18 to a phase separator 20. Line 22 runs from the bottom of the separator to the top of the column at the lower end of line 14.

In typical practice of the process, carboxylic acid and the solvents are introduced into reactor 10 and distillation of the azeotrope of the azeotroping solvent is commenced, the vapors distilling through column 12. Thereupon, hydrogen peroxide is introduced into the reactor through inlet 42 and distillation of the azeotrope begins. Distillation of percarboxylic acid, carboxylic acid, and hydrogen peroxide through the column is prevented by maintaining a relatively high rate of reflux in the column. The water miscible solvent largely remains in the reactor and in the liquid refluxing in the column.

The vapors of the azeotrope are led from the top of the column through line 14 to a condenser 16 where they are condensed and conveyed through line 18 to the phase separator 20. There the condensed liquid separates into an aqueous phase and a non-aqueous phase which consists essentially of the azeotroping solvent. When the organic solvent is heavier than the aqueous phase, the solvent is returned through line 22 to the top of the column. The aqueous phase is either held in the separator or is continuously or periodically discharged through line 24 located at any convenient level. Also provided in the system, for example, in the separator, is an exit line 30 for connection to a suitable vacuum line for evacuating the system and maintaining the system under a subatmospheric pressure. This line may be provided with a cooling jacket or condenser 32 in order to condense residual vapors.

The condensed water discharging through line 24 may be conveyed to a settling chamber (not shown) where entrained or entrapped solvent (if any) is allowed to separate from the water and is recovered. The aqueous phase may be discarded or it may be processed further to recover any dissolved hydrogen peroxide and/or organic solvent.

This distillation is continued until the major portion of the water is driven off. Thus, a product containing less than 15 percent, usually less than 7.5 percent by weight of water (excluding the organic solvent forming the azeotrope) is produced.

It will be understood that the process may be conducted by adding the carboxylic acid, hydrogen peroxide, and solvent, together with catalyst, directly to the reactor 10. However, it is frequently convenient to effect this reaction outside the equipment illustrated in the drawing and then, after the reaction has proceeded essentially to equilibrium, the mixture is supplied to the reactor 10 and the distillation of the azeotrope is commenced in order to drive the reaction to a greater degree of equilibrium.

Often, because of the solubility of the water miscible solvent in the water immiscible solvent, and also because some portion of the water miscible solvent may distill off, the solvent collected in separator 20 may contain an appreciable concentration of water which recycles with the solvent. As a consequence, it becomes difficult to drive the reaction to completion because of the recycling water. In such a case, a dehydration agent, such as alumina, silica gel or the like 40, may be deposited as a porous bed in separator 20 to dry the solvent and remove water therefrom. Alternatively, the organic solvent collected in separator 20 may be withdrawn from the separator and passed through a suitable drying column, such as alumina or silica gel drying columns, or the solvent may be sent to a still to azeotropically distill off the water and thereby produce a dry solvent. The dry solvent is then returned directly to reactor 10 or to the top of column 12 or to any intermediate point in column 12 from the top to the bottom thereof.

Often it is advantageous to contact the solvent before its return with a cation exchange resin in order to remove traces of metal ions which may otherwise accumulate in the system and catalytically increase the rate of decomposition of either the hydrogen peroxide, the percarboxylic acid, or both. In this case, a bed of the resin may be deposited in separator 20 along with the drying material, or in lieu thereof, and the solvent passed through the bed before it is discharged into column 12.

Although the drawing illustrates a batch process for carrying out this invention when utilizing a water immiscible solvent which is heavier than water, the process may also be carried out with a water immiscible solvent which is less dense than water and the process may be carried out in a continuous manner rather than in the batch manner illustrated.

The following examples are illustrative:

Example I

The apparatus used was substantially as illustrated in the accompanying drawing except that line 22 connected to the top of the phase separator 20 and water withdrawal line 24 was located at the bottom of separator 20. To the reactor 10 was added 500 milliliters of a mixture of ethylene glycol dimethyl ether and benzene in equal parts by volume. Thirty grams of distilled and recrystallized azelaic acid and 5 grams of re-distilled sulfuric acid in concentrated form was added and the resulting solution was heated to reflux at an absolute pressure of 312 millimeters mercury, and water in the apparatus being removed azeotropically by distilling the azeotrope, condensing it, and separating the solvent from the water in the separating tank, and returning the solvent.

At this point, 14.5 grams of hydrogen peroxide solution containing 83.2 percent $H_2O_2$ was added and distillation was continued. When no further water was collected azerotropically in the separating chamber, distillation was stopped. About 81.7 percent of the azelaic acid was converted to a product analyzing as diperazelaic acid.

Example II

A mixture of 3 parts by volume of ethylene dichloride and one part by volume of dioxane gas used as solvents in this experiment, using the apparatus illustrated in the drawing. The reactor 10 was held at a temperature of 58–63° C. Enough azelaic acid was added to the solvent to provide an initial azelaic acid concentration of 25 percent by weight. 0.89 percent by weight of concentrated sulfuric acid was added initially. The system was heated until refluxing in column 12 began and an amount of hydrogen peroxide containing 81 percent by weight of $H_2O_2$ sufficient to provide 10 percent by weight of $H_2O_2$ in excess of the stoichiometric amount required to peroxidize all of the azelaic acid was slowly added.

Distillation and recycle of ethylene dichloride was continued for 3.5 hours. Alumina desiccant and a cation exchange resin were added to the separator 20 to a height that would allow the aqueous phase to separate above these materials.

The resulting reaction product in reactor 10 was chilled to minus 30° C. and filtered to recover diperazelaic acid in solid state.

The process of Example II may be repeated with similar results using other water miscible solvents, such as ethylene glycol dimethyl ether, in lieu of dioxane and in the same volume proportions.

*Example III*

Thirty grams of re-distilled, re-crystallized azelaic acid. was dissolved in a mixture of 150 milliliters of distilled dioxane and 400 milliliters ethylene dichloride. About 5 grams of distilled anhydrous sulfuric acid was added as a catalyst and the solution charged to a reactor. The mixture was heated under reflux and 15.6 grams of hydrogen peroxide solution containing 83 percent $H_2O_2$ was added. Reflux was continued for a period of 5 hours at a temperature of 40 to 41° C. and an absolute pressure of 95 millimeters of mercury. Approximately 91 percent of the azelaic acid was converted to a product analyzing as diperazelaic acid. Strong acid catalysts other than sulfuric acid may be used, including methanesulfonic acid, toluene sulfonic acid, and strong cation exchange resins in the acid form.

The process herein contemplated is especially useful in producing the peracids from aliphatic and cycloaliphatic or aromatic acids, such as acetic acid, propionic acid, maleic acid, fumaric acid, glutaric acid, adipic acid, pelargonic acid, azelaic acid, lauric acid, cyclohexane carboxylic acid, 1,4-cyclohexanedicarboxylic acid, and the maleic acid adduct of cyclopentadiene or its hydrogenated derivative, benzoic acid, and the like.

While the process is useful for the peroxidation of aromatic acids to produce the corresponding peracids, it appears to be slower and more difficult to drive to completion. Nevertheless, aromatic acids, such as phthalic acid or anhydride, terphthalic acid or isophthalic acid, may be treated as herein contemplated.

Although the present invention has been described with reference to specific details of certain embodiments, it is not intended that such details shall be regarded as limitations upon the scope of the invention except insofar as included in the accompanying claims.

What is claimed:

1. In the process of preparing a peracid by reacting hydrogen peroxide with a carboxylic acid and distilling water and water immiscible solvent which forms an azeotrope with water from the resulting reaction mixture, the improvement which comprises conducting the distillation from a mixture which contains sufficient inert water soluble organic solvent that no layer of aqueous phase can separate from the organic liquid phase.

2. The process of claim 1 wherein the mixture contains enough water soluble solvent to ensure establishment of a single liquid phase in the reaction mixture comprising the peracid.

3. The process of claim 1 wherein the water soluble solvent is water miscible and also is miscible with the organic solvent.

4. The process of claim 1 wherein enough water soluble solvent is provided to provide at least 0.7 part by weight of said solvent per part by weight of peracid.

5. The process of claim 1 wherein enough water soluble solvent is provided to provide at least one part by weight of said solvent per part by weight of peracid.

6. The process of claim 1 wherein the water soluble solvent boils at a temperature above the boiling temperature of the azeotrope.

7. In the process of preparing a peracid by reacting hydrogen peroxide with a carboxylic acid and water and inert water immiscible solvent which forms an azeotrope with water, the improvement which comprises conducting the distillation from a mixture which contains sufficient inert water soluble organic solvent that no layer of aqueous phase can separate from the organic liquid phase, condensing the vapors from said distillation to form two liquid phases, drying the condensed solvent phase and returning it to the distilling vapors.

8. The process of claim 7 wherein the condensed solvent phase is contacted with a cation exchange resin.

References Cited by the Examiner

UNITED STATES PATENTS 2,814,641   11/1957   Philips et al. _____ 260—502
2,877,266   3/1959    Korach _____ 260—502

LORRAINE A. WEINBERGER, *Primary Examiner.*

M. WEBSTER, *Assistant Examiner.*